United States Patent Office 3,732,218
Patented May 8, 1973

3,732,218
QUATERNARY SUBSTITUTED TRIAZINES
Hoelzle Gerd, Liestal, and Paul Ulrich, Basel, Switzerland, assignors to Ciba-Geigy AG, Basel, Switzerland
No Drawing. Application Nov. 12, 1968, Ser. No. 775,208, now Patent No. 3,632,294, which is a continuation-in-part of application Ser. No. 317,138, Oct. 18, 1963. Divided and this application Feb. 4, 1971, Ser. No. 112,808
Int. Cl. C07d 55/14
U.S. Cl. 260—248 NS                3 Claims

ABSTRACT OF THE DISCLOSURE

New quaternary nitrogen compounds and dyeing processes using these quaternary nitrogen compounds are provided. The quaternary nitrogen compounds may be represented by the formula

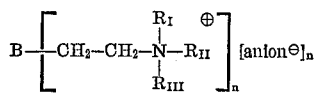

wherein B represents an acidifying substituent, $R_I$, $R_{II}$ and $R_{III}$ each represents an alkyl radical, or one of them represents an $NH_2$-group while the remaining radicals are linked together forming 5 and 6-membered cycloalkyl residues; $n$ is a small whole number and anion$^\ominus$ represents the negative radical of a monobasic or polybasic acid.

The dyeing processes provided are for the coloring of fibrous materials with reactive compounds in which the quaternary nitrogen compound is employed as dyeing assistant to promote the reaction between the reactive compound and the fibrous material.

---

This application is a divisional application of Ser. No. 775,208, filed Nov. 12, 1968 which application is a continuation-in-part of our appliaction Ser. No. 317,138, filed Oct. 18, 1963, and now abandoned. It relates to new quaternary nitrogen compounds and dyeing processes using these compounds.

New quaternary nitrogen compounds have been found which have no dyestuff character and which corresponds to the formula

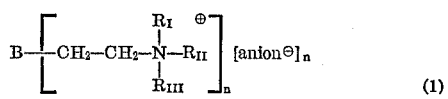

wherein B represents an acidifying substituent, $R_I$, $R_{II}$ and $R_{III}$ each represents an alkyl radical, or $R_I$ represents an $NH_2$-group and the remaining radicals represent alkyl radicals or are linked together forming 5 and 6-membered cycloalkyl residues, or all the radicals are linked together forming a bicyclic alkyl residue containing a tertiary nitrogen atom; $n$ is a small whole number and anion$^\ominus$ represents the negative radical of a monobasic or polybasic acid.

The compounds of the Formula 1 have no dyestuff character and must therefore neither dye substrata nor have a true, distinct color of their own. In other respects, they are composed of the radical

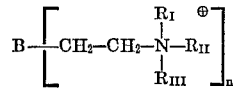

and $n$ anions which latter, as shown in the formula

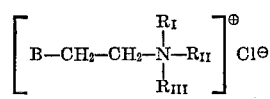

may be linked only by an electrovalent bond with

or, as shown in the formula

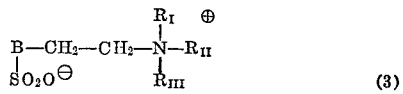

in the case of the sulfonate ion, such an anion may be linked on the one hand by an electrovalent bond with

and on the other by a covalent bond with B.

B in the Formula 1 represents an acidifying substituent which may be composed in a wide variety of ways; for example, it may be a carboxylic acid amide group linked through its carbon atom with Y. There are suitable monocarboxylic acid amide groups (that is to say in this case carboxylic acid amide groups derived from monocarboxylic acids and monoamines), where $n=1$, or dicarboxylic acid amide groups (derived from monocarboxylic acids and diamines), where $n=2$. As an example of a dicarboxylic acid amide group there may be mentioned the group —CO—HN—$R_1$NH—OC— where $R_1$ is a bridge member, for example a phenylene group.

Also in the case of the monocarboxylic acid amides the amide nitrogen may be further substituted, for example by alkyl or hydroxyalkyl groups. Alternatively, an unsubstituted $H_2N$—OC— group may be concerned. A further acidifying substituent B is the nitrile group N≡C, where $n=1$.

Furthermore, B may be bound on the one hand to a ring nitrogen atom of a 1:3:5-trimethylene-triamine preferably the compound of the formula

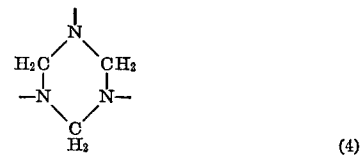

$n$ in the latter case being 3, and on the other hand to —$CH_2CH_2$—. Finally, B may be a sulphone group linked through the sulfur atom with —$CH_2CH_2$— preferably an arylmonosulfone radical, such as a para-toluenesulfone radical, where $n=1$.

The radical

in the Formula 1 is linked directly with the bridge member —$CH_2CH_2$—, and the other respects satisfies the conditions stipulated above. The quaternary nitrogen radical may contain, for example, the radical of a tertiary amine or of a tertiary hydrazine.

The tertiary amines may belong to the aliphatic or heterocyclic series and correspond, for example, to the formula (5)

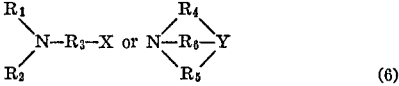

where $R_1$ and $R_2$ each represents an aliphatic radical with 1 to 4 carbon atoms, for example alkyl, hydroxyalkyl or alkoxyalkyl radicals; $R_3$ represents an aliphatic radical with 1 to 10 carbon atoms, for example an alkylene or alkyl radical, X represents a hydrogen atom, an unsubstituted or substituted hydroxyl group, the group

the group

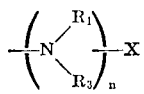

(where $n=1$, 2, 3 or 4), or a possibly substituted aryl radical; $R_4$, $R_5$ and $R_6$ each represents an aliphatic radical with 1 to 4 carbon atoms, for example an alkylene radical, and Y stands for a nitrogen atom or a

group.

In addition to one or more than one tertiary amine group the amines may contain further substituents, advantageously such as do not react with reactive dyestuffs under the conditions used in the dyeing process. As such substituents there are suitable halogen atoms, or nitro, alkoxy or hydroxyl groups. However, preferred use is made of amines that contain apart from at least one tertiary amino nitrogen atom only carbon and hydrogen atoms.

Suitable aliphatic amines of the Formula 5 are, for example, those of the formula (7)  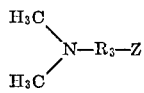

where $R_3$ has the above meaning and Z stands for a hydrogen atom or a hydroxyl group. Thus, these amines are such compounds as dimethylallylamine, dimethyl-$\beta$-hydroxyethylamine or dimethyl-$\beta$-ethoxyethylamine. Valuable results are also obtained with aliphatic amines of the formula (8) 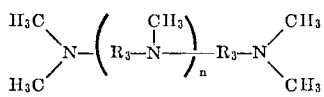

where $R_3$ has the above meaning and $n=1$, 2, 3 or 4. To this series of compounds belong the polyalkylenepolyamines such, for example, as pentamethyl-diethylenetriamine or hexamethyl-triethylenetetramine. Useful results have also been obtained with aliphatic amines of the formula

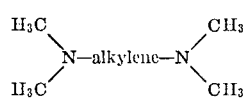 (9)

where the alkylene radical contains 1 to 10 carbon atoms, for example 1:2-bis-dimethylamino-ethane, 1:4 - bis - dimethylamino-butane or 1:6 - bis - dimethylamino-hexane. The most suitable aliphatic amines are those which correspond to the formula

(10)  

in which the alkyl radical contains 1 to 4 carbon atoms. Such compounds are, for example, dimethylethylamine, dimethylpropylamine, dimethylisopropylamine and above all trimethylamine.

As a rule, these aliphatic amines should not contain more than 6 carbon atoms per tertiary amino group. The term "heterocyclic amines of the Formula 6" describes tertiary amines in which the nitrogen atom, or both nitrogen atoms, belongs or belong at the same time to several rings so that the nitrogen atom of the tertiary amino group(s) forms a bridge member between several rings. These rings may contain substituents such as halogen atoms, or nitro, hydroxyl, keto or alkoxy groups; they may also be fused together with other rings or ring systems which themselves may likewise contain substituents. Preferred use is made of heterocyclic amines that contain only carbon and hydrogen atoms apart from the tertiary amino group(s). It has also proved advantageous when no more than 8 carbon atoms per tertiary amino group are present. Suitable representatives of this group are, for example, amines of the formula

(11) 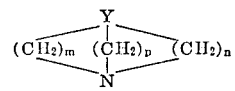

where Y has the above meaning and $m$, $n$ and $p$ each $=1$, 2, 3 or 4. As relevant examples there may be mentioned inter alia pyrrolicidine, 1-aza-bicyclo(2:2:1)heptane, quinuclidine, quinuclidone, 1-aza-bicyclo(3:2:1)octane, 1-aza-bicyclo(3:2:2)nonane and more especially 1:4-diazabicyclo(2:2:2)octane (also called triethylenediamine).

The last-mentioned compound corresponds to the formula

(12) 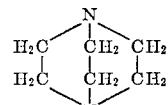

which may also be represented by the following simplified formula

(13) 

When the quaternary nitrogen compounds of the Formula 1 belong to the hydrazine series, they must likewise contain at least one tertiary nitrogen atom, that is to say that one of the two nitrogen atoms of such a hydrazine grouping must be linked as a tertiary nitrogen atom with two carbon atoms, whereas the other nitrogen atom may be substituted or unsubstituted. Further suitable are cyclic hydrazine compounds, more especially those in which one of the two hydrazine nitrogen atoms or both form a member of one or more than one ring.

In general, it is advantageous to use hydrazines that are soluble in the dyebath or printing paste. In addition to one or more than one hydrazine group they may contain substituents that do not react with the reactive dyestuffs, for example halogen atoms, or nitro, alkoxy or hydroxyl groups. It is, however, preferable to use hydrazines that contain only carbon and hydrogen atoms apart from at least one >N—N< group, for example hydrazines that contain at least one tertiary nitrogen atom and are substituted by non-aromatic hydrocarbon radicals.

Such hydrazines may correspond, for example, to the formula

(14) 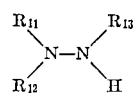

where $R_{11}$ and $R_{12}$ each represents an aliphatic hydrocarbon radical with up to 4 carbon atoms, and $R_{13}$ represents likewise such a radical or an HS—CS— group, an $HO_3S$-group, an

(15) 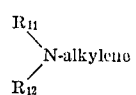

group or preferably a hydrozen atom; $R_{11}$ and $R_{12}$ together with the one nitrogen atom may also form a preferably 5- to 6-membered ring.

The purely aliphatic hydrazines of the Formula 14 correspond with advantage to the formula

(16) 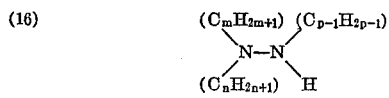

where $m$ and $n$ each = 1, 2, 3 or 4, preferably = 1 and $p$ = 1, 2, 3, 4 or 5. The aliphatic hydrocarbon radicals in these hydrazine compounds may be branched, but preferably they are linear.

Finally, there may also be mentioned especially those hydrazine compounds in which the vicinal nitrogen atoms at the same time form members of two fused rings, for example those of the formula

(17) 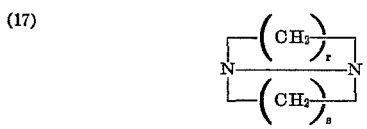

where $r$ and $s$ may be identical or different and each represents 3 or 4.

Specifically, there may be mentioned as examples the following hydrazines:

N:N-dimethylhydrazine,
N:N-methylethylhydrazine,
N-aminopyrrolidine of the formula (17a) 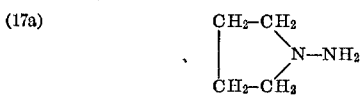

N-aminopiperidine of the formula

(18) 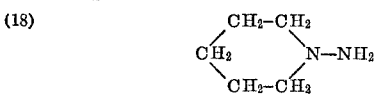

1:5-diaza-bicyclo(0:3:3)octane of the formula

(19) 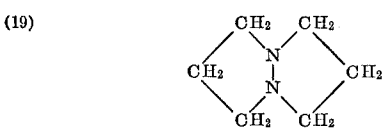

(20) 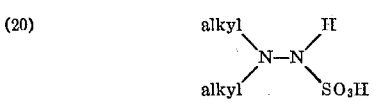

(21) 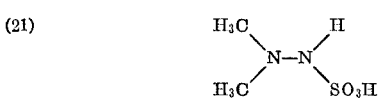

(22) 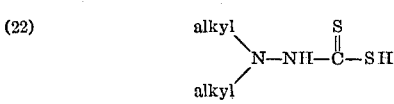

(23) 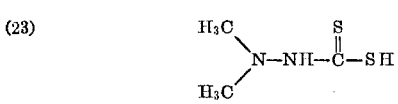

The anion$^\ominus$ may be the negative radical of a monobasic or of a polybasic, preferably inorganic, acid. As most important radicals of this kind there may be mentioned above all halogen$^\ominus$, preferably Cl$^\ominus$, SO$_4$H$^\ominus$ or PO$_4$H$_2^\ominus$ because of their ready accessibility, but this, of course, does not exclude other appropriate radicals.

The quaternary nitrogen compounds of the Formula 1 can be manufactured by reacting a tertiary nitrogen compound in the molecular ratio of 1:$n$ with halogen compounds of the formula

(24)          B(CH$_2$CH$_2$-halogen)$_n$ or with esters of the formula (24a)          B(—CH$_2$CH$_2$—O—R$_7$)$_n$ where B and $n$ have the above meanings and R$_7$ represents the radical of a polybasic inorganic acid. The quaternization may take place by way of an additive reaction, when the tertiary nitrogen compound is reacted with a heterocyclic compound that contains at least one mobile halogen atom and is free from acid substituents capable of forming anions, such as carboxylic acid or sulphonic acid groups. When, on the other hand, a tertiary nitrogen compound is reacted, for example, with a compound of the formula

(25) 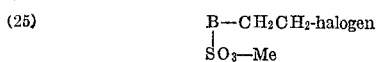

where B and Y have the above meanings and Me represents a cation, preferably an alkali metal ion—MeCl is eliminated and a quaternary nitrogen compound of the formula (3) 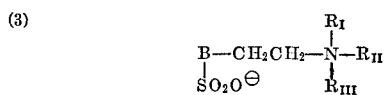

is formed, where B, Y and R have the above meanings. Quaternary compounds of the Formula 1 that contain an N:N-dialkylhydrazine radical linked with Y are also obtained by reacting a suitable tertiary nitrogen base with chloroamine.

The new quaternary compounds of the Formula 1 are advantageously used as assistants in coloring, i.e. dyeing and printing fibrous materials with reactive compounds suitable for dyeing purposes i.e. reactive dyestuffs or reactive dyestuff intermediates, using as an agent capable of promoting the reaction between the dyestuff and the substratum a quaternary nitrogen compound that has no dyestuff character and corresponds to the above Formula 1. Promotion of the reaction between dyestuff and substratum means also a stabilisation, that is to say delaying of the hydrolysis, of reactive dyestuffs which in aqueous preparations substantially exchange the reactive grouping for an unreactive hydroxyl group before the former can enter the desired covalent bond with the substratum.

As generally applied, the term reactive dyestuffs describes dyestuffs that enter a covalent bond with the material to be dyed during the dyeing or printing process; as a rule, this is accompanied by the splitting off of the reactive substituent of the dyestuff. The speed at which the bond between dyestuff and substratum is formed depends on one hand on the dyeing conditions—such as temperature, pH value of the dyebath or of the printing paste—and on the other on the reactivity of the reactive grouping of the dyestuff. It is known that in this respect there exist considerable differences between individual reactive dyestuffs. With the aid of the quaternary nitrogen compounds of the Formula 1 it is now possible to increase considerablly the reactivity of these dyestuffs.

It is of advantage to use in the present process water-soluble reactive dyestuffs, for example organic dyestuffs containing carboxyl groups, sulfonic acid groups or aliphatically bound sulfuric acid ester groups. As relevant reactive groupings there may be mentioned the epoxy groups, ethyleneimino, isocyanate, isothiocyanate, carbamic acid aryl ester groups, the propiolic acid amide grouping, mono- and dichlorocrotonyl amino groups, chloroacrylamino, acrylamino and vinylsulfone groups and above all groupings that contain an exchangeable substituent and are easy to split with removal of the bond electron pair, for example sulfonyl halide groups, aliphatically bound sulfuric acid ester groups and aliphatically bound sulfonyloxy groups, and halogen atoms, more especially an aliphatically bound chlorine atom. Advantageously, these exchangeable substituents are in position $\gamma$ and $\beta$ of an aliphatic radical which is bound to the dyestuff molecule directly or through an amino, sulfone or sulfonamide group. In the case of these relevant dyestuffs which contain as labile substituents halogen atoms, these exchangeable halogen atoms may also be present in an aliphatic acyl radical, for example in an acetyl radical, or in β-position or α- and β-positions of a propionyl radical or preferably in a heterocycle, for example in a pyrimidine or pyridazine ring, or above all in a triazine ring. The dyestuffs contain advantageously a grouping of the formula

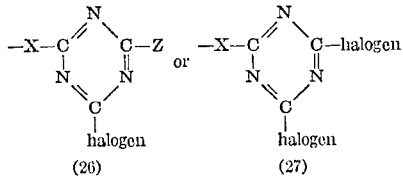

where X represents a nitrogen bridge and Z a hydrogen atom, a possibly substituted amino group, an etherified hydroxyl or mercapto group, a halogen atom, or an alkyl, aryl or aralkyl group, and A represents a hydrogen or halogen atom. The halogen atoms are, for example, bromine or preferably chlorine atoms.

Particularly valuable are dyestuffs that contain the grouping of the formula (28)

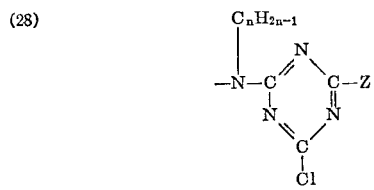

where $n=1, 2, 3$ or $4$, and Z has the above meaning.

It is also possible to use dyestuffs that contain diphenoxytriazine groupings as well as those which contain a grouping of the formula (29)

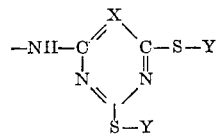

where X stands for

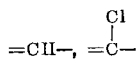

or $=N-$ and Y represents a

or a

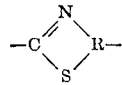

group, where R stands for an ortho-aryl radical.

Further suitable reactive groupings are the following radicals: Trichloropyridazine, dichloroquinoxaline, dichlorobutene, halogenated pyridazone; sulfonyl-dichloropropylamide, allylsulfide, 2-halogeno-benzthiazolecarbamide, isothiocyanate and β-sulfatopropionamide radicals.

A very wide variety of organic dyestuffs may be used in the performance of the present process, for example oxazine, triphenylmethane, xanthene, nitro, acridone, azo, anthraquinone and phthalocyanine dyestuffs.

From among the azo dyestuffs there may be mentioned as examples disazo and trisazo dyestuffs, and above all monoazo dyestuffs. A large number of such reactive azo an identical amount of dyestuff less than 1 molecular prothem here in greater detail.

From the series of the anthraquinone dyestuffs there may be mentioned especially 1-amino-4-bromoanthraquinone-2-sulfonic acid and the dyestuffs derived from 1:4-diaminoanthraquinone-2-sulfonic acid. These and other anthraquinone dyestuffs are manufactured in the usual manner. As suitable phthalocyanine dyestuffs there may be specially mentioned those which are derived from nickel or copper phthalocyanine sulfonamides whose molecule contains at least two free sulfonic acids and which contain in at least one sulfonamide radical a group comprising at least one labile halogen atom. Further suitable are phthalocyanines containing as solubilizing, and at the same time reactive, substituents aliphatically bound acid sulfuric acid ester groups, for example one of the formula

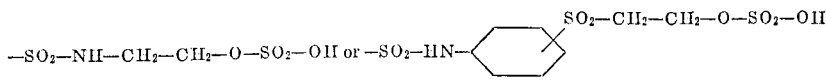

and may contain as further solubilizing groups sulfonic acid groups. Such dyestuffs are manufactured in the known manner.

The present process may also be performed by using vat dyestuffs that are water-soluble or insoluble also in the oxidized form and dispersion dyestuffs having the character of reactive dyestuffs.

There are several advantageous variants for the performance of the present process. Thus it is possible to use different proportions, for example for every reactive group of 1 molecular proportion of dyestuff at least 1 molecular proportion of the quaternary nitrogen compound, or for an identical amount of dyestuff less than 1 molecular proportion of the quaternary nitrogen compound. For either ratio there may be used the following two methods:

(a) The fibrous material is dyed or printed with a preparation consisting of the reactive dyestuff and the quaternary nitrogen compound;

(b) The reactive dyestuff and the quaternary nitrogen compound are applied separately to the fibrous mamaterial.

The variant (a) is suitable not only for a stoichiometric ratio but especially well also for a ratio in which for every reactive group of 1 mole of dyestuff less than 1 mol of the quaternary nitrogen compound of the Formula 1 is used; it is especially suitable for a catalytic ratio which, as generally understood, means a ratio that is substantially below the aforementioned stoichiometric ratio. The amount of quaternary compound referred to the reactive dyestuff may, however, vary within certain limits. Referred to the weight of the dyestuff, the catalytic amount of the quaternary compound may be about 0.1 to 10% by weight and preferably about 0.2 to 2% by weight.

When performing the variant (b)—using the quaternary compound likewise in a stoichiometric or catalytic proportion—the reactive dyestuff and the quaternary compound are applied to the fibrous material in either order of succession, if desired interposing an intermediate drying operation.

In other respects it may be left open whether and to what extent the reaction between the reactive dyestuff and the quaternary compound by either variant and in the different ratios gives rise to other reactions, such as splitting of the quaternary compound of the Formula 1 and any formation of quaternary nitrogen compounds of the reactive dyestuffs.

What has been said above regarding the reactive dyestuffs applies similarly also to the reactive dyestuff intermediates, for example reactive coupling components.

The present process may be used for coloring, i.e. dyeing and printing, a large variety of fibrous materials such as paper or leather, above all textiles, for example those consisting of animal fibers such as silk and especially of cellulosic fibers such as linen or cotton, and also fibers of regenerated cellulose such as rayon (viscose rayon) or spun rayon. Quite generally, dyeing and printing—more especially also when a catalytic proportion of the quaternary compound is used—follow the dyeing and printing practice usual for reactive dyestuffs. For dyeing and printing cellulosic textile materials it is of special advantage to use concomitantly an inorganic acid acceptor such as a carbonate, hydroxide, bicarbonate or phosphate of an alkali metal or a mixture thereof, and also bases such as trimethyl benzyl ammonium hydroxide or sodium trichloroacetate. In conjunction with reactive vat dyestuffs there may be used the conventional reducing agents such as sodium hydrosulfite, thiourea dioxide, sodium sulfide or sodium sulfoxylate. When, however, a quaternary compound of the Formula 1 is used, it is possible to fix reactive vat dyestufs on the fiber even in the absence of the afore-mentioned reducing agents.

Other substances conventionally added to dyebaths and printing pastes such as electrolytes, for example sodium chloride or acetate, or non-electrolytes such as urea, or thickening agents such as alginates, may likewise be used. To prevent any undesired reduction, more especially in the case of delicate dyestuffs, one of the conventional additives, such as meta-nitrobenzenesulfonic acid, may be employed. As a rule the quaternary compound is incorporated with the dyebath or with the printing paste. When a two-stage dyeing method is used, the application of the dyestuff and the fixation with the acid acceptor being performed separately, the quaternary compound may alternatively be added in the second stage.

As mentioned above the fibrous materials are dyed or printed under the conditions generally used for working with reactive dyestuffs. The present process allows the reaction times and/or reaction temperatures to be reduced and/or to produce more intensive dyeings and prints, for example in the cold pad batch method, in the exhaustion method, in the pad steam and pad dry methods, in the pad wet steam method and in printing. Depending on the method selected the dyestuffs may be fixed within a wide temperature range, for example from 20 to 200° C., or above it, for example at 250 to 300° C.

Unless otherwise indicated, parts and percentages in the following examples are by weight. The dyestuffs are as a rule shown in the form of the free acids but they are actually used in the form of the alkali metal salts thereof.

EXAMPLE 1

A solution of 12 parts of the compound of the formula (101a)

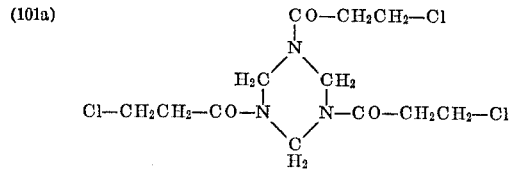

in 50 parts by volume of dimethylformamide is mixed with 6 parts of N:N-dimethylhydrazine.

The batch is left to itself for several hours at room temperature. The precipitate formed is filtered off, and washed with dimethylformamide and dioxane. The resulting, highly hygroscopic product of the probable formula (101b)

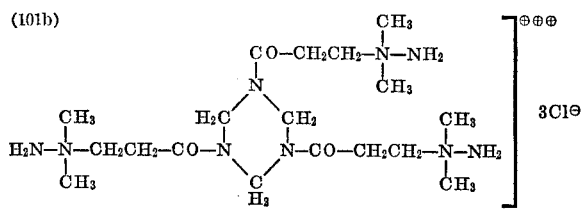

is dried at room temperature under vacuum.

EXAMPLE 2

The product of the probable formula (102)

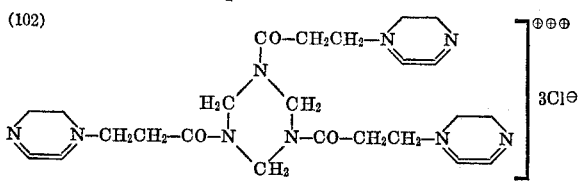

is obtained by using instead of N:N-dimethylhydrazine an equivalent amount of 1:4-diaza(2:2:2)bicyclooctane in the method of Example 1.

EXAMPLE 3

A solution of 12 parts of 1:4-diaza(2:2:2)-bicyclooctane in 100 parts by volume of dimethylformamide is mixed with 9 parts of β-chloropropionitrile and then left to itself for several hours at room temperature. The precipitated crystals are filtered off, and washed with a small amount of dimethylformamide and then with 100 parts by volume of acetone. The resulting product of the formula (103)

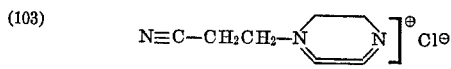

is dried under vacuum.

EXAMPLE 4

A mixture of 6 parts of N:N-dimethylhydrazine, 100 parts by volume of dimethylformamide and 9 parts of β-chloropropionitrile is kept for several hours at room temperature, then heated to 50° C., mixed with 200 parts by volume of dioxane and cooled to 20° C. After 4 hours the precipitated product of the formula (104)

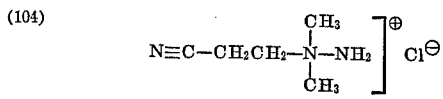

is filtered off, washed with 100 parts by volume of dioxane and dried under vacuum.

In an analogous manner the compounds of the formulae (104a)

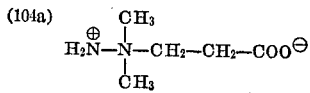

(104b)

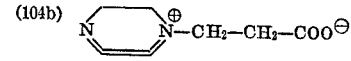

are prepared, using as starting materials β-propiolactone and N:N-dimethylhydrazine, or β-propiolactone and 1:4-diaza(2:2:2)bicyclooctane.

EXAMPLE 5

A solution of 11 parts of the compound of the formula (105a)

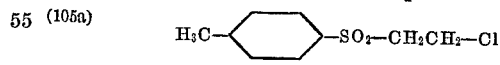

in 50 parts by volume of dimethylformamide is mixed with a solution of 6 parts of 1:4-diaza(2:2:2)bicyclooctane in 30 parts by volume of dimethylformamide, and the reaction mixture is left to itself for several hours at room temperature. The precipitated product of the formula (105b)

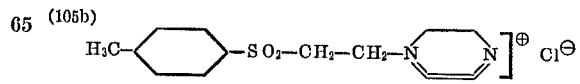

is then filtered off, washed with acetone and dried under vacuum.

The compound of the formula (105c)

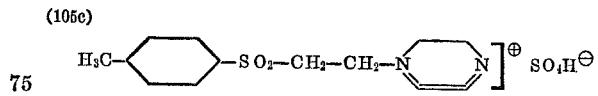

is manufactured in a similar manner, using as starting materials the sodium salt of the compound of the formula (105d) 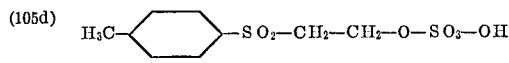

and 1:4-diaza(2:2:2)bicyclooctane.

EXAMPLE 6

A solution of 22 parts of the compound of the formula (105a) 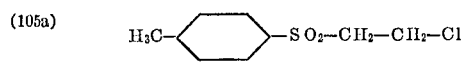

in 100 parts by volume of dimethylformamide is mixed with 6 parts of N:N-dimethylhydrazine. The reaction mixture is kept for 5 to 10 hours at room temperature and mixed with 500 parts by volume of dioxane while being agitated. After another 3 hours the precipitated product of the formula (106) 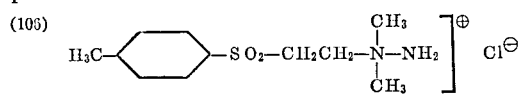

is filtered off, washed with dioxane and dried under vacuum.

In an analogous manner the compounds of the formulae (106a) 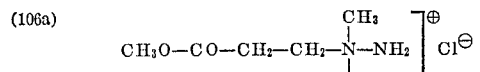

(106b) 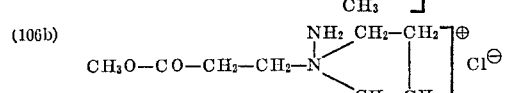

(106c) 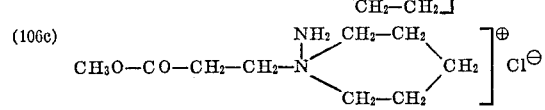

are manufactured, using as starting materials β-chloropropionic acid methyl ester and N:N-dimethylhydrazine, or N-aminopyrolidine respectively, or N-aminopiperidine.

EXAMPLE 7

A solution of 100 parts by volume of dimethylformamide, 11 parts of β-chloropropionic acid amide and 12 parts of 1:4-diaza(2:2:2)bicyclooctane is kept for 3 days at 20 to 25° C. The precipitated product of the formula (107) 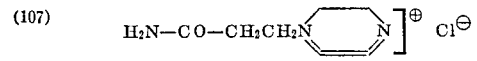

is then filtered off, washed with dioxane and dried under vacuum.

EXAMPLE 8

The product of the formula (108) 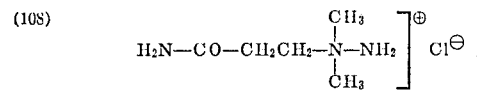

is prepared as described in Example 7, replacing 1:4-diaza(2:2:2)bicyclooctane by an equivalent proportion of N:N-dimethylhydrazine.

EXAMPLE 9

A solution of 40 parts of the dyestuff of the formula (201) 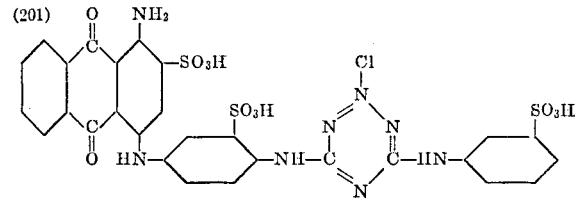

in 700 parts of boiling water is cooled to 20° C. and then mixed with 10 parts by volume of sodium hydroxide solution of 30% strength, 20 parts of crystalline sodium sulfate, and 0.1 part to 1 part of the compound of the formula (101b). The resulting solution is made up with cold water to a volume of 1000 parts.

This solution is used to pad a cotton fabric to a weight increase of 75%, which is immediately thereupon rolled up and kept in this rolled-up state for 6 to 12 hours at 20° C. After this storing the unfixed portion of dyestuff is removed by a good rinse in cold and in boiling water, and the dyeing is finally soaped in the usual manner.

The resulting blue dyeing has good fastness to light and washing which is much stronger than a comparable dyeing obtained in the absence of the quaternary compound.

Good results are also obtained when 15 parts of trisodium phosphate instead of 10 parts by volume of sodium hydroxide solution are used.

Similar results are obtained when the abovementioned compound of the Formula 101b is replaced by the compound of the Formula 102, 104a, 104b or 106.

EXAMPLE 10

A cotton fabric is impregnated at 50° C. with a padding solution containing per 1000 parts of water 30 parts of the dyestuff of the formula (202) 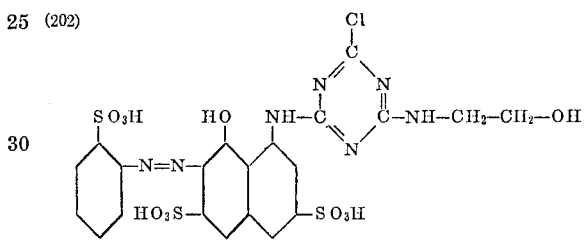

and then dried. The fabric is then padded with a solution containing per 1000 parts of water 200 parts of calcinated sodium sulfate, 10 parts by volume of sodium hydroxide solution of 30% strength and 0.2 to 5 parts of the compound of the Formula 107. The fabric is rolled up, stored for 3 to 6 hours at room temperature and then finished off as described in Example 1.

The resulting brilliant red dyeing is distinctly stronger than a comparable dyeing produced without adding the compound of the Formula 107.

When the compound of the Formula 107 is replaced by the quaternary compound of the Formula 108, and instead of sodium hydroxide 20 parts of sodium carbonate, stronger dyeings are likewise obtained than when this additive is not present.

Equally good results are obtained on viscose rayon fabrics or spun rayon fabrics.

EXAMPLE 11

A solution of 1.5 parts of the dyestuff of the formula (203) 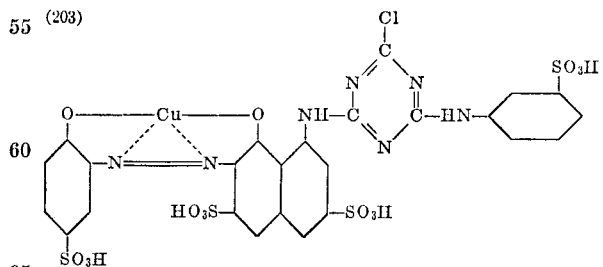

in 250 parts of boiling water is added to a dyebath containing per 750 parts of water 60 parts of sodium chloride. 50 parts of cotton yarn are dyed in the resulting dyebath for 30 minutes at 40° C. The fixation of the dyestuff deposited on the fiber follows upon this exhaustion operation in the same dyebath, adding 15 parts of trisodium phosphate and 0.5 part of the compound of the Formula 102. The fixation takes 1½ hours at 40° C. The dyed yarn is thoroughly rinsed in cold and in hot water and finally soaped at the boil.

A brilliant violet dyeing is obtained which has good fastness properties and is of much greater tinctorial strength than a dyeing produced in the absence of the triquaternary ammonium compound.

When the dyestuff used above is replaced by an equivalent amount of the dyestuff of the formula (204)

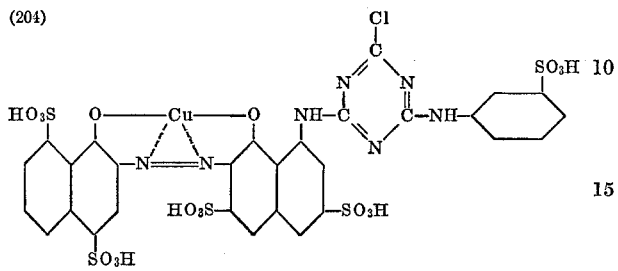

good results are likewise obtained.

Similarly good results are also obtained when 2 parts of the quaternary compound of the Formula 103 are used.

Distinct effects are also obtained by using the dyestuff of the formula (205)

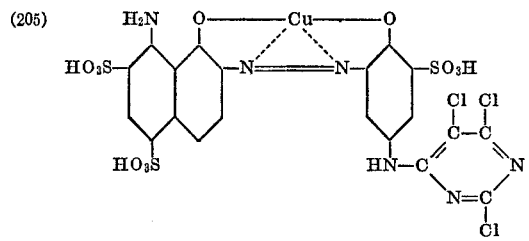

which is obtained by condensing the copper complex of the aminoazo dyestuff with tetrachloropyrimidine in an aqueous medium at a pH ranging from 6 to 9.

EXAMPLE 12

30 parts of the dyestuff of the formula (206)

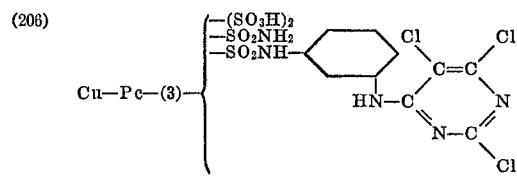

(CuPC = copperphthalocyanine radical)

and 20 parts of the dyestuff of the formula (207)

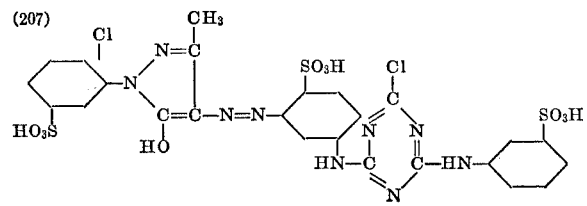

are together dissolved in 800 parts of boiling water; the solution is cooled to 25° C., mixed with 16 parts of trisodium phosphate, 8 parts by volume of sodium hydroxide solution of 30% strength, and 2.5 parts of the compound of the Formula 102, and the whole is made up with cold water to 1000 parts by volume.

A cotton fabric is impregnated on a padder with the above solution to a weight increase of 70%, then rolled up and stored for 6 hours at a constant temperature of 25° C. After this storing the material is given a good rinse in cold and in hot water and finally soaped at the boil.

A brilliant yellowish green dyeing is obtained. A comparable combination dyeing produced in the absence of the quaternary ammonium compound is of lesser tinctorial strength.

EXAMPLE 13

By using instead of the dyestuffs defined in Example 12 a combination of 30 parts of the dyestuff of the formula (208)

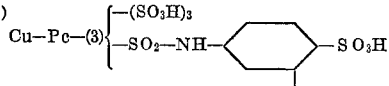
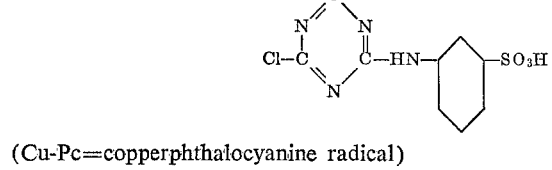

(Cu-Pc = copperphthalocyanine radical)

and 20 parts of the dyestuff of the formula (209)

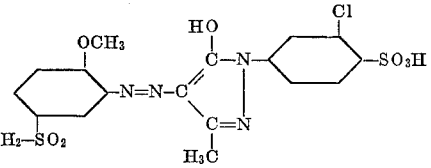

in the identical dyeing method, a brilliant green dyeing is obtained which has similar, good properties.

By using 20 parts of the 1:2-cobalt complex of the dyestuff of the formula (210)

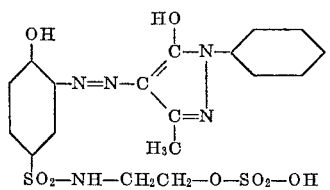

as yellow component, an olive shade is produced.

EXAMPLE 14

A cellulose fabric is padded at 20 to 30° C. with a solution containing per 1000 parts of water 20 parts by volume of sodium hydroxide solution of 30% strength, 20 parts of sodium sulfide and 20 parts of the dyestuff of the formula (211)

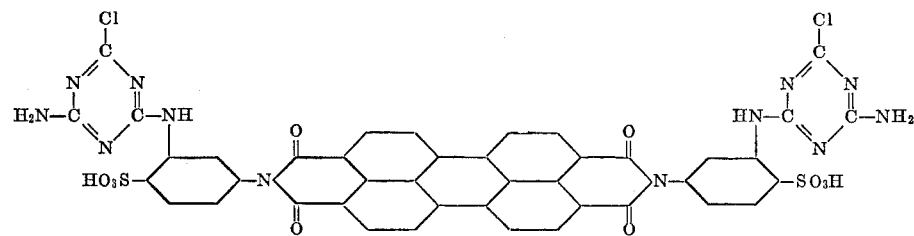

EXAMPLE 15

A solution of 0.6 part of the dyestuff of the Formula 202 used in Example 9 in 100 parts of hot water is added to a dyebath containing in 900 parts of water 50 parts of sodium chloride. 20 parts of real silk are dyed in this dyebath for 30 minutes at 40° C. The dyestuff which has deposited only in substance on the fiber is fixed by adding 2 parts of sodium carbonate and 0.5 part of the compound of the Formula 104 for 90 minutes at 40° C., then thoroughly rinsed in cold and hot water and finally soaped at 70° C.

The resulting brilliant red dyeing is fast to light and washing and considerably stronger than a comparable dyeing produced without adding the quaternary compound.

When the dyestuff used above is replaced by an equivalent proportion of the disazo dyestuff of the formula (212)

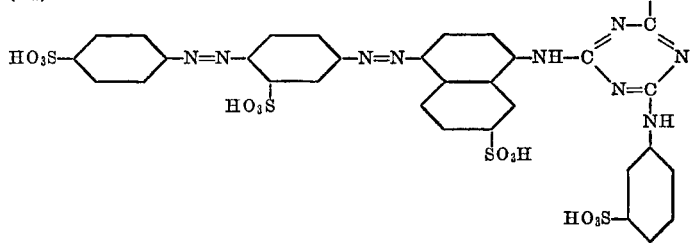

a yellowish brown dyeing is obtained.

EXAMPLE 16

A solution of 40 parts of the coupling component of the formula (213)

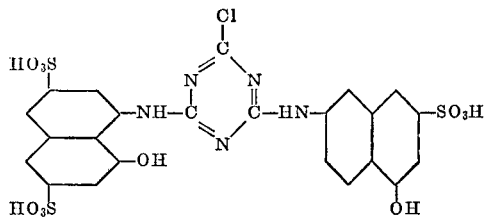

in 928.6 parts of water is mixed with 10 parts of sodium hydroxide solution of 30% strength, 20 parts of crystalline sodium sulfate and 1.4 parts of the compound of the Formula 104.

A mercerized cotton fabric is impregnated with this solution on a padder, rolled up and stored for 3 hours at a constant temperature of 30° C., whereupon the unfixed portion of dyestuff is washed out by a good rinse in cold and hot water.

The fabric impregnated in this manner is then developed with a freshly prepared solution containing per 1000 parts of water 2 parts of the diazo compound of metachloraniline, then coupled, rinsed and soaped at the boil. The brillilant scarlet shade thus obtained has good fastness to washing and rubbing.

A comparable dyeing produced in the absence of the afore-mentioned quaternary ammonium compound is substantially weaker.

When the development is performed with 2 parts (per 1000 parts of water) of diazotized 1-amino-2-methoxy-5-nitrobenzene instead of with meta-chloraniline, a deep claret dyeing is obtained which has good general properties of fastness and is likewise much stronger than a comparable dyeing produced in the absence of the compound of the Formula 104.

EXAMPLE 17

A cotton fabric is padded at 40° C. with a solution containing in 1000 parts of water 30 parts of the dyestuff of the formula (214)

$$Cu\text{-}Pc\text{-}(3)\text{---}\begin{cases}\text{---}(SO_3H)_{2.5}\\ \text{---}(SO_2\text{---}NH\text{---}CH_2\text{---}CH_2Cl)_{1.5}\end{cases}$$

(Cu-Pc = radical of copperphthalocyanine)
60 parts of urea, 20 parts of sodium carbonate and 3 parts of the compound of the Formula 107, then dried at 60 to 80° C. and steamed for 30 seconds. The steamed fabric is rinsed in cold and hot water and soaped at the boil.

The resulting turquoise dyeing has good properties of fastness.

A dyeing obtained by the identical method but without addition of the compound of the Formula 107 was of substantially lesser tinctorial strength.

EXAMPLE 18

A printing paste is prepared from the following ingredients:

50 parts of the dyestuff of the Formula 202 of Example 10,
200 parts of urea,
378 parts of water,
350 parts of sodium alginate thickening 50:1000,
10 parts of sodium bicarbonate,
2 parts of the compound of the Formula 101b and
10 parts of sodium meta-nitrobenzenesulfonate, and printed on a cotton fabric on a roller printing machine; the fabric is then dried and steamed for 1 minute on a Mather Platt ager at 100° C. The fixed print is rinsed in cold and hot water and then dried. A red, level print is obtained of the same tinctorial strength as when fixing is performed for 8 minutes in the absence of the compound of the Formula 101b.

A similar result is obtained on spun rayon fabric.

Similar effects are obtained by using 5 parts of the quaternary compound of the Formula 105b, 106a, 106b or 106c.

EXAMPLE 19

A printing paste is prepared from the following ingredients:

50 parts of the dyestuff of the formula (215)

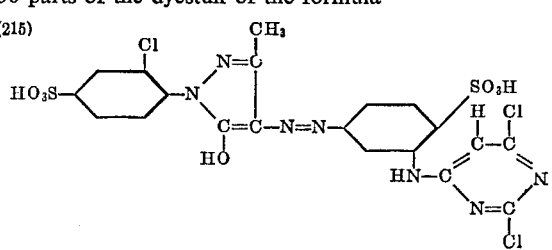

[obtained by condensing the aminoazo dyestuff with 2:4:6-trichloropyrimidine]
100 parts of urea,
420 parts of water,
400 parts of sodium alginate thickening 50:1000,
10 parts of sodium bicarbonate.
10 parts of the compound of the Formula 1005b and
10 parts of sodium meta-nitrobenzenesulfonate, and printed on a cotton fabric on a roller printing machine or by the screen printing method. The fabric is then dried, fixed for 30 seconds in a rapid ager and finished off as described in Example 8. The resulting yellow print is of greater tinctorial strength than when the compound of the Formula 105b is omitted.

Similar results are obtained by using the compound of the Formula 107 instead of the compound of the Formula 105b.

EXAMPLE 20

A printing paste is prepared from the following ingredients:

50 parts of the dyestuff of the formula (216)
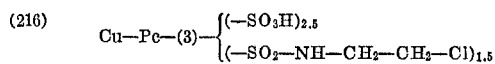

(Cu-Pc-=radical of copperphthalocyanine)

400 parts of water and
550 parts of sodium alginate thickening 50:1000 and printed on a cotton fabric which is then dried and impregnated on a padder with a solution containing in 1000 parts of water 150 parts of sodium chloride, 100 parts of potassium carbonate, 30 parts by volume of sodium hydroxide solution of 30% strength and 10 parts of the compound of the Formula 107, then squeezed to a weight increase of 70% and, without intermediate drying, fixed for 30 seconds in a rapid ager. The fabric is then finished off as described in Example 8.

The resulting turquoise print is of substantially greater tinctorial strength than when the above-mentioned quaternary ammonium compound is omitted.

A similarly good effect is achieved on spun rayon fabric.

Alternatively, the quaternary compound of the Formula 107 may be incorporated directly with the printing paste.

EXAMPLE 21

A printing paste is prepared from the following ingredients:

50 parts of the dyestuff of the Formula 208,
200 parts of urea,
320 parts of water,
350 parts of sodium alginate thickening 50:1000,
60 parts of aqueous potassium carbonate solution of 50% strength,
10 parts of the compound of the Formula 107 and
10 parts of sodium meta-nitrobenzenesulfonate and printed on a cottom fabric on a roller printing machine. The fabric is dried and then fixed for 30 seconds in a rapid ager and finished off as described in Example 15.

The resulting turquoise print is of considerably greater tinctorial strength than when the dyed fabric is fixed for 8 minutes without the compound of the Formula 118 first having been added.

Instead of the compound of the Formula 107 there may be used an equivalent proportion of the compound of the Formula 102 and 103.

An equal result is obtained when the dyestuff of the Formula 208 is replaced by the dyestuff of the Formula 206.

EXAMPLE 22

A printing paste is prepared from the following ingredients:

50 parts of the dyestuff of the Formula 202 used in Example 9.
200 parts of urea,
375 parts of water,
350 parts of sodium alginate thickening 50:1000,
10 parts of sodium bicarbonate,
5 parts of the compound of the Formula 101b and
10 parts of sodium meta-nitrobenzenesulfonate and printed on a cotton fabric on a roller printing machine, then dried and stored for 24 hours at 35 to 40° C. and finished off in the known manner. A red print is obtained. A substantially weaker shade is obtained when the quaternary compound is omitted.

An equal effect is obtained when the printed fabric is stored at a lower temperature (20 to 30° C.) for 2 to 3 days, whereas at a higher temperature (60 to 80° C.) a comparable effect is achieved within 30 to 60 minutes.

EXAMPLE 23

A mercerized cotton fabric is padded at 30° C. with a liquor containing in 1000 parts of water 30 parts of the dyestuff of the formula (217)
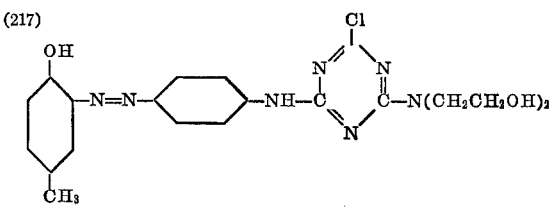

as well as 250 parts by volume of ethylene monoglycolether, 30 parts by volume of sodium hydroxide solution of 30% strength and 2.5 parts of the compound of the Formula 107.

The impregnated fabric is then rolled up and stored for 6 to 12 hours at room temperature, then rinsed in cold and in hot water and finally soaped at the boil.

The resulting yellow dyeing is distinguished by good fastness properties and is distinctly stronger than a comparable dyeing produced without adding the afore-mentioned compound of the Formula 107.

EXAMPLE 24

30 parts of the dyestuff of the Formula 202 mentioned in Example 10 are mixed with 50 parts of urea and dissolved in 700 parts of boiling water. This solution is cooled to 40° C., mixed with 20 parts of sodium carbonate and 2 to 10 parts of the compound of the Formula 105b, and the whole is made up with cold water to 1000 parts.

A cotton fabric is impregnated with this solution on a padder to a weight increase of 75%, then directly, that is to say without intermediate drying, steamed for 1 minute and finally rinsed and soaped in the usual manner.

The resulting brilliant red dyeing displays very good fastness to light and washing. When dyeing as described above but in the absence of the compound of the Formula 105b, a substantially weaker dyeing results.

Advantageous effects are also achieved when the dyeing, before the steaming operation, is stored for 30 to 60 minutes in the wet, rolled-up state (to prevent partial drying).

EXAMPLE 25

A solution of 5 parts of the dyestuff of the formula (218)

[Structure: dyestuff with Cl-triazine linking two sulfophenyl-NH groups to a naphthol-azo-sulfophenyl moiety, bearing SO₃H, OH, and SO₃H groups]

in 250 parts of boiling water is added to a dyebath containing per 750 parts of water 60 parts of sodium chloride. 50 parts of cotton yarn are dyed in the resulting dyebath for 30 minutes at 40° C. The fixation of the dyestuff deposited on the fiber follows upon this exhaustion operation in the same dyebath adding 15 parts of trisodium phosphate and 0.5 part of the compound of the Formula 101b. The fixation takes 1½ hours at 40° C. The dyed yarn is thoroughly rinsed in cold and in hot water and finally soaped at the boil.

A brilliant orange dyeing is obtained which has good fastness properties and is of much greater tinctorial strength than a dyeing produced in the absence of the triquaternary ammonium compound.

We claim:

1. A compound of the formula $$\left[ \begin{array}{c} \text{COCH}_2\text{CH}_2\text{R} \\ \overset{\oplus}{\underset{}{N}} \\ \text{RH}_2\text{CH}_2\text{COC}-N \quad N-\text{COCH}_2\text{CH}_2\text{R} \end{array} \right]_n \cdot [\text{anion}^{\ominus}]_n$$

in which $n$ is a small whole number, anion$^{\ominus}$ is the negative radical of a monobasic or polybasic acid, all R groups are the same and R is a member selected from the group consisting of the following formulae $$\begin{array}{c} R_1 \\ \diagdown \\ N-R_3-X \\ \diagup \\ R_2 \end{array} \quad \text{and} \quad -N\begin{pmatrix} R_4 \\ R_6-Y \\ R_5 \end{pmatrix}$$

wherein $R_1$ and $R_2$ are each alkyl, hydroxyalkyl or alkoxyalkyl having 1 to 4 carbon atoms; $R_3$ is alkylene or alkenylene having 1 to 10 carbon atoms; X is (1) hydrogen, (2) hydroxy, (3)

$$-N\begin{pmatrix} R_1 \\ R_2 \end{pmatrix}$$

wherein $R_1$ and $R_2$ are defined as above, (4)

$$-\begin{pmatrix} R_1 \\ \diagdown \\ N-R_3 \\ \diagup \end{pmatrix}_n -X$$

wherein $R_1$, $R_3$ and X are defined as above and $n$ is an integer from 1 to 4; $R_4$, $R_5$ and $R_6$ are each alkylene having 1 to 4 carbon atoms and Y is a nitrogen atom or a $$-\overset{|}{\underset{|}{C}}H$$

group; and a hydrazine of the formulae $$\begin{array}{c} R_{11} \quad R_{13} \\ \diagdown \quad \diagup \\ N-N \\ \diagup \quad \diagdown \\ R_{12} \quad H \end{array} \quad \text{and} \quad -N\begin{bmatrix} -(\text{CH}_2)_r- \\ -(\text{CH}_2)_s- \end{bmatrix}N$$

wherein $R_{11}$ and $R_{12}$ are each alkyl having 1 to 4 carbon atoms; $R_{13}$ is hydrogen, alkyl having 1 to 5 carbon atoms, the $$\text{HS}-\overset{S}{\underset{\|}{C}}- \text{ group,}$$

the SO₃H group, the $$\begin{array}{c} R_{11} \\ \diagdown \\ N\text{-alkylene} \\ \diagup \\ R_{12} \end{array}$$

group wherein $R_{11}$ and $R_{12}$ are each lower alkyl having 1 to 4 carbon atoms and $R_{11}$ and $R_{12}$ taken together form a 5- or 6-membered ring; and $r$ and $s$ each represents the integer 3 or 4.

2. The quaternary nitrogen compound of the formula $$\left[ \begin{array}{c} \text{CH}_3 \\ \text{CO-CH}_2-\text{CH}_2-\overset{|}{N}-\text{NH}_2 \\ \overset{|}{N} \quad \text{CH}_3 \\ \text{CH}_3 \quad \text{CH}_2 \diagdown \text{CH}_2 \quad \text{CH}_3 \\ \text{H}_2\text{N}-\overset{|}{N}-\text{CH}_2-\text{CH}_2-\text{CO}-\text{N} \quad N-\text{CO}-\text{CH}_2-\text{CH}_2-\overset{|}{N}-\text{NH}_2 \\ \overset{|}{\text{CH}_3} \quad \text{CH}_2 \quad \overset{|}{\text{CH}_3} \end{array} \right]^{\oplus \oplus \oplus} 3\text{Cl}^{\ominus}$$

3. The quaternary nitrogen compound of the formula $$\left[ \begin{array}{c} \text{CO-CH}_2-\text{CH}_2-\text{N} \diagup \diagdown \text{N} \\ \overset{|}{N} \\ \text{CH}_2-\text{CH}_2 \quad \text{CH}_2 \diagdown \text{CH}_2 \\ \text{N}-\text{CH}_2-\text{CH}_2-\text{N}-\text{CH}_2-\text{CH}_2-\text{CO}-\text{N} \quad \text{N}-\text{CO}-\text{CH}_2-\text{CH}_2-\text{N} \diagup \diagdown \text{N} \\ \text{CH}_2-\text{CH}_2 \quad \text{CH}_2 \end{array} \right]^{\oplus \oplus \oplus} 3\text{Cl}^{\ominus}$$

References Cited

UNITED STATES PATENTS 3,539,547   11/1970   Hoffman _____ 260—248

JOHN M. FORD, Primary Examiner

U.S. Cl. X.R.

260—268 BC, 465.5 R, 570.5 P, 326.3, 567.6 R